United States Patent
Fukui et al.

(10) Patent No.: US 6,266,349 B1
(45) Date of Patent: Jul. 24, 2001

(54) METHOD AND APPARATUS FOR DETECTING FRAME IN DATA STREAM

(75) Inventors: Kiyoshi Fukui; Masato Nonaka, both of Tokyo (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 0 days.

(21) Appl. No.: 09/148,622

(22) Filed: Sep. 4, 1998

(30) Foreign Application Priority Data

Sep. 8, 1997 (JP) .................................................. 9-242809
Mar. 4, 1998 (JP) ................................................ 10-052235

(51) Int. Cl.[7] ................................ H04J 3/06; H04J 3/12; H04L 7/00
(52) U.S. Cl. .......................... 370/515; 370/528; 375/367
(58) Field of Search ................................... 370/503, 504, 370/509, 508, 507, 511, 512, 513, 514, 515, 528; 375/354, 356, 359, 360, 363, 365, 366, 367, 368

(56) References Cited

U.S. PATENT DOCUMENTS

| | | | | |
|---|---|---|---|---|
| 5,781,595 | * | 7/1998 | Fuji ........................................ | 375/357 |
| 5,966,416 | * | 10/1999 | Hendrickson ........................ | 370/367 |
| 6,002,710 | * | 12/1999 | Hendrickson et al. .............. | 370/503 |
| 6,021,311 | * | 2/2000 | Gibson et al. ........................ | 370/515 |
| 6,026,506 | * | 2/2000 | Anderson et al. ................... | 714/746 |
| 6,128,313 | * | 10/2000 | Chapman et al. ................... | 370/465 |
| 6,157,631 | * | 12/2000 | Rohani ................................. | 370/515 |

OTHER PUBLICATIONS

"Multiplexing Protocol For Low Bitrate Multimedia Communication Over Low Error–Prone Channels". Tom Geary, International Telecommunication Union H.223–Annex A, pp. 1–6. Sep. 1997.

"Multiplexing Protocol For Low Bitrate Multimedia Communication". International Telecommunication Union, Telecommunication Standardization Standardization sector of ITU H.223, pp. 1–39, Prepared by ITU–T Study Group 15 (1993–1996).

* cited by examiner

Primary Examiner—Ricky Ngo
Assistant Examiner—Phuc Tran
(74) Attorney, Agent, or Firm—Rabin & Champagne, P.C.

(57) ABSTRACT

In a conventional data transmission and receipt apparatus using PN flags according to PN sequence, there has occurred a flag emulation due to a bit stream similar to a PN flag in a frame of the data stream, which disables transmission of the frame therebetween. To solve the problem, the data transmission and receipt apparatus of the present invention inserts a mark representing that there is laid a bit stream similar to the PN flag into the frame while the data receipt apparatus distinguishes such a bit stream from the PN flag. Thereby, the data receipt apparatus is capable of receiving the frame involving the bit stream similar to the PN flag without occurrence of a flag emulation.

20 Claims, 16 Drawing Sheets

METHOD AND APPARATUS FOR DETECTING FRAME IN DATA STREAM

BACKGROUND OF THE INVENTION

1. Field of the Invention

The present invention relates to a method and an apparatus for detecting frames in a data stream including frames and flags for use in data transmission and receipt system such as portable telephones, and in particular a method and an apparatus for distinguishing regular flags used for detecting the frames from a bit stream which forges the pattern of the regular flags.

2. Description of Prior Art

There has been published a technical document "Universal Communication Interface" (image data media society bulletin Vol. 51, No. 2, p. 174–182 (1997), which teaches HDLC (High-Level Data Link Control) system as a scheme of transmitting a plurality of frames each including variable-length data. The HDLC employs a pattern "01111110" as flags indicative of boundaries between the frames, which are hereinafter referred to as the HDLC flags. Under the HDLC system, the transmission apparatus inserts HDLC flags between frames to be sent to the receipt apparatus, thus transmitting a data stream including the frames and the HDLC flags. The receipt apparatus detects the HDLC flags to provide the boundaries between the frames. Hence, use of the HDLC flags establishes synchronization of the frames.

A bit stream laid in a frame, however, might forge the same pattern as that of the HDLC flags, or might act as a false HDLC flag, which causes the receipt apparatus to recognize the bit stream as a boundary between a frame and an adjacent frame. This wrong operation is hereinafter referred to as the flag emulation.

To avoid the flag emulation, the HDLC system employs the zero bit insertion. As shown in FIG. 11, to implement the zero bit insertion, a common transmission apparatus incorporates the zero bit insertion circuit 1000 and the flag insertion circuit 1001. Into the data transmission apparatus are fed a frame stream including a plurality of frames and a frame synchronization signal denoting the boundaries between the frames. A common receipt apparatus incorporates the flag detection circuit 2000, the flag deletion circuit 2001, and the zero bit deletion circuit 2002. From the data receipt apparatus are output a frame stream including a plurality of frames and a frame synchronization signal denoting the boundaries between the frames, both of which corresponds to the frame stream and the frame synchronization signal of the data transmission apparatus.

In the transmission apparatus, the zero bit insertion circuit 1000 inserts a zero bit "0" into the incoming frame stream and the flag insertion circuit 1001 inserts HDLC flags between the frames of the frame stream. In the receipt apparatus, the flag detection circuit 2000 detects those HDLC flags, the flag deletion circuit 2001 deletes these HDLC flags, and the zero bit deletion circuit 2002 deletes the zero bit "0" inserted by the zero bit insertion circuit 1000.

More definitely, pursuant to the zero bit insertion scheme, upon occurrence of one zero bit and continues five one bits "011111" in a frame, a zero bit "0" is inserted immediately thereafter. As shown in FIG. 12, for example, a bit stream including the same pattern "01111110" as that of the HDLC flags experiences the zero insertion to change into "011111010". This can avoid presence of a bit stream the pattern of which is identical with that of the HDLC flags.

Hence, the data stream having no bit stream with the pattern "01111110" reaches the receipt apparatus. After establishing the frame synchronization using the regular HDLC flags, the receipt apparatus deletes the zero bit laid after the continuous five one bits to regenerate the bit stream "01111110". Thus, even though there exists a bit stream "01111110" in a frame of the frame stream of the transmission apparatus, the data receipt apparatus does not misunderstand the bit stream "01111110" as a HDLC flag, that is to say, the data receipt apparatus can avoid a flag emulation.

As shown FIG. 13, if there occurs a bit error in a HDLC flag itself during transmission over a propagation path to force the HDLC flag into acting as an arbitrary bit stream, a frame and another frame both of which are adjacent to the deformed HDLC flag appears to be connected to each other via the HDLC flag. The deformed HDLC flag thus disables the receipt apparatus from detecting the boundary between those frames.

As shown in FIG. 14, if there arises in a frame a bit stream having the same pattern as that of the HDLC flags during transmission over a propagation path likewise, the bit stream rises a flag emulation, which divides into two frame portions the frame where the bit stream is laid.

For the purpose of solving the above problems, there has been applied a pseudo random sequence as the flag for frame detection in lieu of the HDLC flag, which is hereinafter referred to as the PN sequence. Further, a flag pursuant to the PN sequence is hereinafter referred to as the PN flag. The PN sequence has a correlation property that is indicative of a correlation value between a bit stream and another bit stream, as shown in FIG. 15. The correlation value is extremely large when all the bits in the former bit stream and all the bits in the latter bit stream completely coincides with each other. To the contrary, the correlation value is small even when there exists a gap of one bit between the former bit stream and the latter bit stream.

Therefore, repetitive comparison of a reference flag having the pattern of the PN flags with a data stream through shifting the reference fag bit-by-bit enables detection of the PN flags. For example, it is assumed that the reference flag laid at the position No. 2 coincides with a PN flag in the data stream while the reference flags laid at the position No. 1 and No. 3 are respectively being shifted by one bit in comparison with the reference flag of the position No. 2. The former reference flag gives an extremely large correlation value, but the latter reference flags give a small correlation value. Accordingly, employing such a PN sequence to compare correlation values with a predetermined threshold value enables detection of regular PN flags, which establishes a frame synchronization based upon those detected PN flags.

As shown in FIG. 16, a typical data transmission apparatus of the PN sequence incorporates the flag insertion circuit 3000, and also a typical data receipt apparatus incorporates the flag correlation detection circuit 4000, and the flag deletion circuit 4001. Into the data transmission apparatus are fed a frame stream and a frame synchronization signal similarly to the data transmission apparatus of the HDLC system. In such a transmission apparatus, the flag insertion circuit 3000 inserts PN flags between the frames of the incoming frame stream in synchronization with the frame synchronization signal, whereby the data stream involving the PN flags reaches the data receipt apparatus. In the receipt apparatus, the flag correlation detection circuit 4000 detects the boundaries between the frames based upon the correlation values between the data stream and the reference flag, and the flag deletion circuit 4001 deletes the PN flags from the data stream. This provides a frame stream and a frame synchronization signal similarly to the data receipt apparatus of the HDLC system. In summary, except for the zero bit insertion/deletion and the flag detection, the data transmission and receipt apparatus using the PN flags function similarly to the data transmission and receipt apparatus using the HDLC flags, as shown in FIG. 17.

If, however, there is laid in a frame of the frame stream a bit stream having the pattern of the PN flags in the data transmission apparatus, the receipt apparatus recognizes the bit stream as a PN flag. As a result, a flag emulation is yielded, which the frame including the bit stream is divided into two frame portions as shown in FIG. 18. Since the flag emulation disables regeneration of the frame including such a bit stream in the data receipt apparatus, there is employed the ARQ (Automatic Repeat Request) method to resend another frame corresponding to the missing frame upon occurrence of the flag emulation. The bit stream in the frame to be sent, however, never changes in pattern, which results in repetition of a flag emulation. Therefore, use of the ARQ method does not enable the receipt apparatus to regenerate the frame involving the bit stream. To summarize, the data transmission and receipt apparatus employing the PN flags cannot manage any bit streams having the same pattern as that of the PN flags.

SUMMARY OF THE INVENTION

It is therefore an object of the present invention to provide a method and an apparatus which is capable of transmitting and receiving a data stream even though the data stream includes a bit stream the pattern of which is similar to the pattern of the PN flag.

According to one aspect of the present invention, there is provided a frame synchronization method including the data stream preparation step having the step of preparing a data stream having a plurality of frames and a plurality of PN flags composed pursuant to PN sequence, each of the plurality of PN flags being laid between a frame and adjacent frame and denoting the boundary therebetween, and the step of transmitting the data stream, and the data stream synchronization step having the step of receiving the data stream, the step of calculating a plurality of correlation values between a reference flag identical with the PN flag and a plurality of bit streams in the data stream, the step of detecting a plurality of bit streams in the data stream having the possibilities of being the PN flags based upon the calculated correlation values, and the step of synchronizing the data stream using the plurality of bit streams having the possibilities of being the plurality of PN flags, wherein the data stream preparation step comprises the step of detecting in the data stream a bit stream similar to the PN flag; and the step of inserting into the data stream a mark specifying the bit stream similar to the PN flag, the data stream synchronization step comprises the step of detecting the mark from the data stream; the step of recognizing a bit stream that is one of the plurality of bit streams having the possibilities of being the PN flags and is specified by the mark, not to be a PN flag, and wherein the step of synchronizing in the data stream synchronization step synchronizes the data stream using the detected plurality of bit steams having the possibilities of the plurality of PN flags except for the bit stream recognized not to be a PN flag.

According to another aspect of the present invention, there is provided a system including a data transmission apparatus that prepares a data stream having a plurality of frames and a plurality of PN flags composed pursuant to PN sequence, each of the plurality of PN flags being laid between a frame and adjacent frame and denoting the boundary therebetween, and a data receipt apparatus that synchronizes the data stream using the plurality of PN flags, wherein the data transmission apparatus comprises a detection circuit detecting in the data stream a bit stream similar to the PN flag; and an insertion circuit inserting into a frame a mark specifying the bit stream similar to the PN flag; the data receipt apparatus comprises a mark detection circuit detecting the mark from the data stream; a calculation circuit calculating correlation values between a reference flag identical with the PN flag and a plurality of bit streams in the data stream; a detection circuit detecting a plurality of bit stream having the possibilities of being the plurality of PN flags; a recognition circuit recognizing a bit stream specified by the mark among the plurality of bit streams having the possibilities of being the PN flags not to be a PN flag and recognizing the plurality of bit streams other than the bit stream specified by the mark to be the plurality of PN flags; and a synchronization circuit synchronizing the data stream using the plurality of bit streams recognized to be the plurality of PN flags.

Since the method and system according to this invention employ a mark indicative of presence of a bit stream similar to the PN flag in the data stream to distinguishing the bit stream from the PN flag, the method and system can synchronize the data stream using only the regular PN flags, not the bit stream similar to the PN flag.

BRIEF DESCRIPTION OF THE DRAWINGS

The present invention will be understood more fully from the detailed description given hereinbelow, taken in conjunction with the accompanying drawings.

DESCRIPTION OF THE PREFERRED EMBODIMENTS

The data transmission and receipt apparatus of the preferred embodiments according to the present invention will be now described with reference to the accompanying drawings hereinafter.

<First Embodiment>

Figure 1:
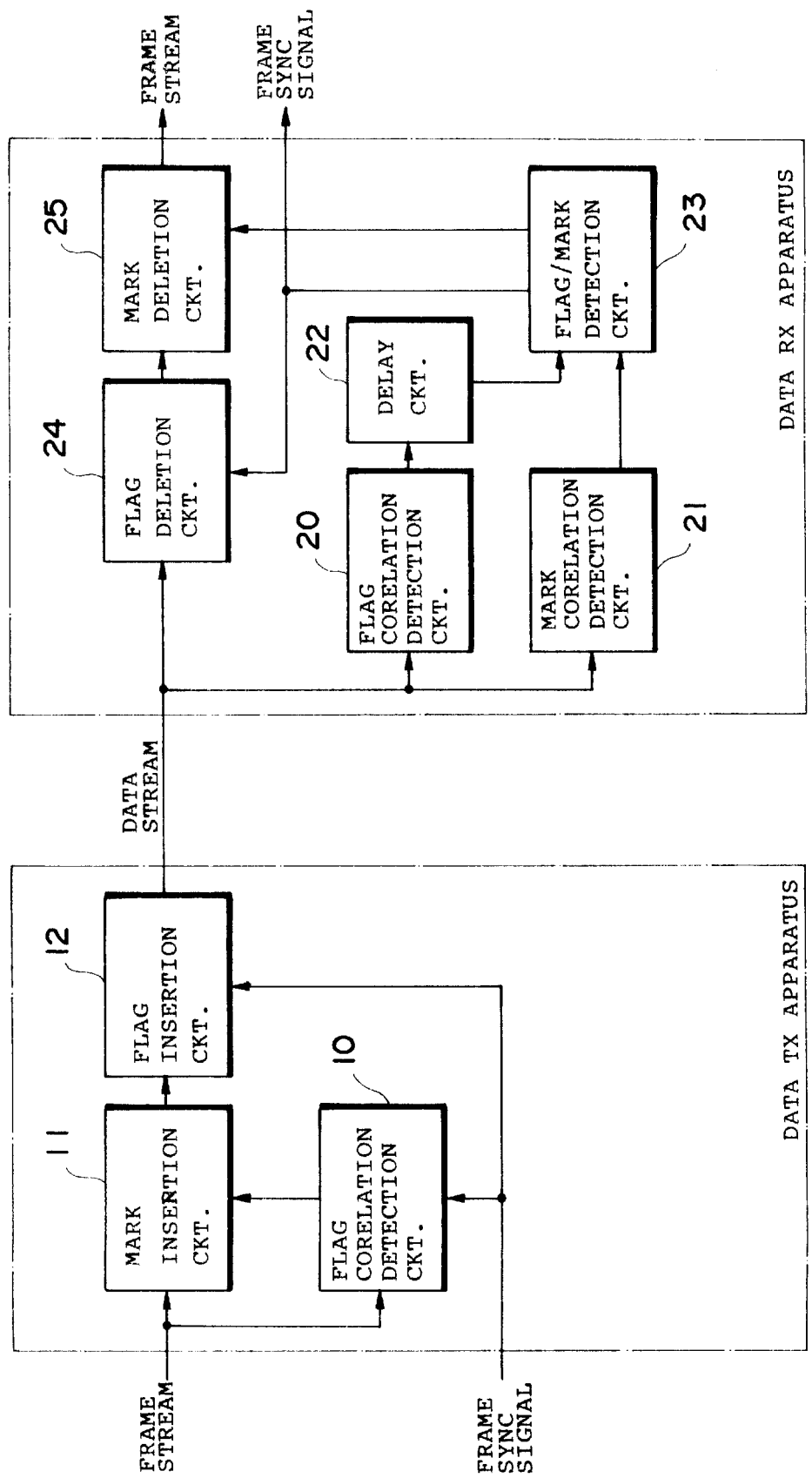
FIG. 1 is a block diagram showing the configuration of the data transmission and receipt apparatus according to the first embodiment.

The data transmission and receipt apparatus of the first embodiment employs a mark indicating presence of a bit stream having the same pattern as that of the PN flag in a data stream. In FIG. 1, the data transmission apparatus incorporates the flag correlation detection circuit 10, the mark insertion circuit 11, flag insertion circuit 12. Into the data transmission apparatus are fed a frame stream including a plurality of frames and a frame synchronization signal indicating the boundaries between the frames. The flag correlation detection circuit 10 detects in the incoming frame stream a bit stream having the same pattern as that of the PN flags, on the basis of correlation values between a plurality of arbitrary bit streams laid in the frame stream and the transmission reference PN flag having the same pattern as that of the regular PN flags, which is hereinafter referred to as the TX ref flag. The mark insertion circuit 11 inserts marks immediately after bit streams having the pattern of the PN flags, wherein the marks each denotes presence of a bit stream similar to the PN flags and is composed pursuant to the PN sequence. The flag insertion circuit 12 inserts PN flags between frames of the frame stream.

The data receipt apparatus incorporates the flag correlation detection circuit 20, the mark correlation detection circuit 21, the delay circuit 22, the flag/mark detection circuit 23, the flag deletion circuit 24, and the mark deletion circuit 25. The flag correlation detection circuit 20 detects the regular PN flags based upon the correlation values between arbitrary bit streams in the received data stream and the receipt reference flag having the same pattern of the regular PN flags, which is hereinafter referred to as the RX ref flag. The flag correlation detection circuit 20 also detects the bit streams in the data stream having the pattern of the PN flags. The mark correlation detection circuit 21 detects the marks laid in the received data stream based upon correlation values between arbitrary bit streams in the received data stream and the receipt reference mark having the same pattern of the marks, which is hereinafter referred to as the RX ref mark. The delay circuit 22 delays the output of the flag correlation detection circuit 20 by a given time. The flag/mark detection circuit 23 detects the bit streams having the pattern of the PN flags based upon the outputs of the mark correlation detection circuit 21 and the delay circuit 22. The flag deletion circuit 24 deletes the regular PN flags from the received data stream. The mark deletion circuit 25 deletes the marks from the received data stream.

Figure 2:
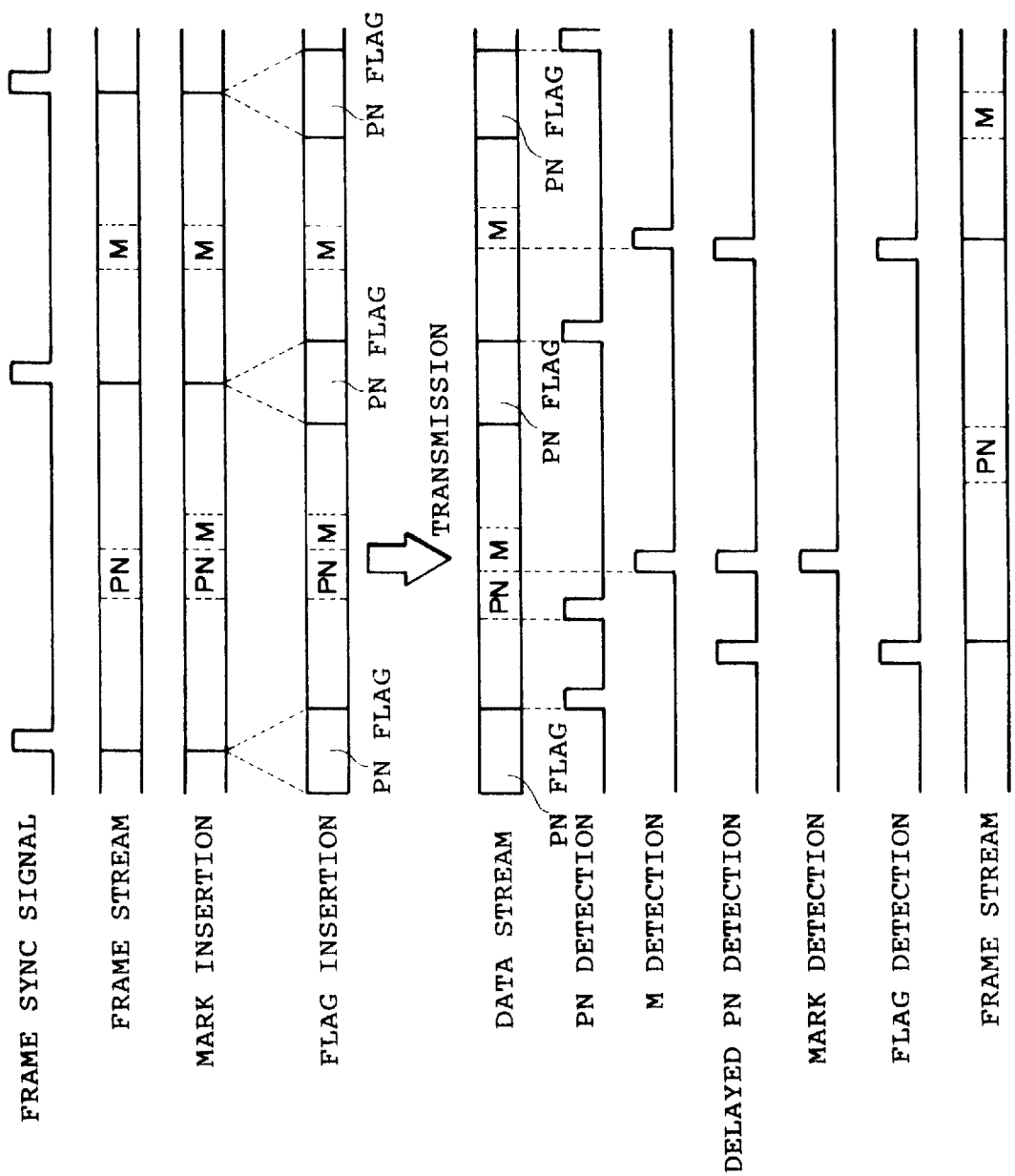
FIG. 2 is a time chart showing the operation of the data transmission and receipt apparatus of the first embodiment.

The operation of the data transmission and receipt apparatus win be described hereinafter with reference to FIG. 2, in which the reference symbol "PN" represents a bit stream similar to the PN flags and the reference symbol "M" represents a bit stream similar to the marks. First, the frame stream and the frame synchronization signal are input to the data transmission apparatus. Next, the flag correlation detection circuit 10 detects in the frame stream the bit streams similar to the PN flags based upon the correlation values between arbitrary bit streams in the frame stream and the TX ref flag, thus outputting to the mark insertion circuit 11 the f-like bit stream detection signal representing such bit streams. Upon receipt of the f-like bit stream detection signal from the flag correlation detection circuit 10, the mark insertion circuit 11 inserts a mark immediately after each of the above bit streams, wherein the mark represents the presence of such a bit stream laid prior to the mark. In synchronization with the frame synchronization signal denoting the boundaries between the frames of the incoming frame stream, the flag insertion circuit 12 inserts regular PN flags between the frames. The data stream involving the above bit streams, the marks, and the PN flags is transmitted to the receipt apparatus.

Upon receiving the data stream from the transmission apparatus, the flag correlation detection circuit 20 shifts the RX ref flag by bit with respect to the received data stream to give correlation values thereof, thereby detecting the positions of the PN flags based upon the correlation values. The mark correlation detection circuit 21 likewise detects the marks. The delay circuit 22 delays the output of the flag correlation detection circuit 20 so that the output of the flag correlation detection circuit 20 and the output of the mark correlation detection circuit 21 are simultaneously fed to the flag/mark detection circuit 23.

For example, on assumption that there are a bit stream BS1 having the pattern of the PN flags and the mark M1 corresponding to the bit stream BS1 in the received data stream, which is unclear to the flag/mark detection circuit 23, the delay circuit 22 delays the output of the flag correlation detection circuit 20 that suggests presence of the bit streams BS1 in such a fashion that the signal and the signal that suggests presence of the mark M1 are simultaneously fed to the flag/mark detection circuit 23. Hence, the flag/mark detection circuit 23 recognizes presence of the corresponding mark M1 as well as presence of the bit stream BS1.

More definitely, the flag/mark detection circuit 23 operates as follows. If given only a signal suggesting presence of a regular PN flag or presence of a bit stream having the pattern of the PN flags from the flag correlation detection circuit 20, the flag/mark detection circuit 23 identifies the object of the presence as a regular PN flag. At this time, the flag/mark detection circuit 23 outputs a flag detection signal indicative of presence of the PN flags to the flag deletion circuit 24, whereby the flag detection signal is output outward as the frame synchronization signal.

As explained above, if simultaneously given both the signal suggesting the bit streams similar to the PN flags from the flag correlation detection circuit 20 and the signal suggesting the bit streams similar to the marks from the delay circuit 22, the flag/mark detection circuit 23 recognizes the objects of the presence as bit streams having the pattern of the PN flags. More specifically, the flag/mark detection circuit 23 does not identify the former bit streams as the PN flags and identifies the latter bit streams as the marks. At this time, the flag/mark detection circuit 23 outputs to the mark deletion circuit 25 the mark detection signal indicative of presence of the marks, but does not output to the flag deletion circuit 24 any flag detection signal indicative of presence of the PN flags.

If given only a signal suggesting presence of bit streams similar to the marks from the mark correlation detection circuit 21, the flag/mark detection circuit 23 judges that there are laid such bit streams in the data stream.

Upon receipt of the flag detection signal from the flag/mark detection circuit 23, the flag deletion circuit 24 deletes from the data stream the regular PN flag corresponding to the flag detection signal. Upon not receipt thereof, the flag deletion circuit 24 allows the data stream to reach the mark deletion circuit 25 with no change. Similarly, upon receipt of the flag mark detection signal from the flag/mark detection circuit 23, the mark deletion circuit 25 deletes from the data stream the marks corresponding to the mark detection signal. In this way, there can be provided a frame stream which involves the bit streams having the pattern of the PN flags, but neither the regular PN flags nor the marks corresponding to those bit streams, as well as a frame synchronization signal, both of which correspond to the frame stream and the frame synchronization signal of the data transmission apparatus.

According to the first embodiment, the data transmission apparatus detects in the frame stream to send to the data receipt apparatus bit streams having the pattern of the PN flags, and also adds a corresponding mark immediately after each bit stream. upon receipt of the data stream, the data receipt apparatus detects the regular PN flags and the bit streams using each correlation value, and likewise detects the marks corresponding to the bit streams. In addition, the data receipt apparatus keeps the bit streams laid prior to the marks in the data stream while removing the regular PN flags and the marks from the data stream. This can avoid occurrence of a flag emulation due to the bit streams having the same pattern as that of the PN flags.

Besides the above effect, applying the PN sequence to the marks permits use of the correlation values thereof, which facilitates detection of the marks in the data stream.

<Second Embodiment>

Next, the data transmission and receipt apparatus of the second embodiment will be now described. The data transmission and receipt apparatus feature addition of marks in bit streams having the pattern of the PN flags, in comparison with the first embodiment which adds the marks after those bit streams.

Figure 3:
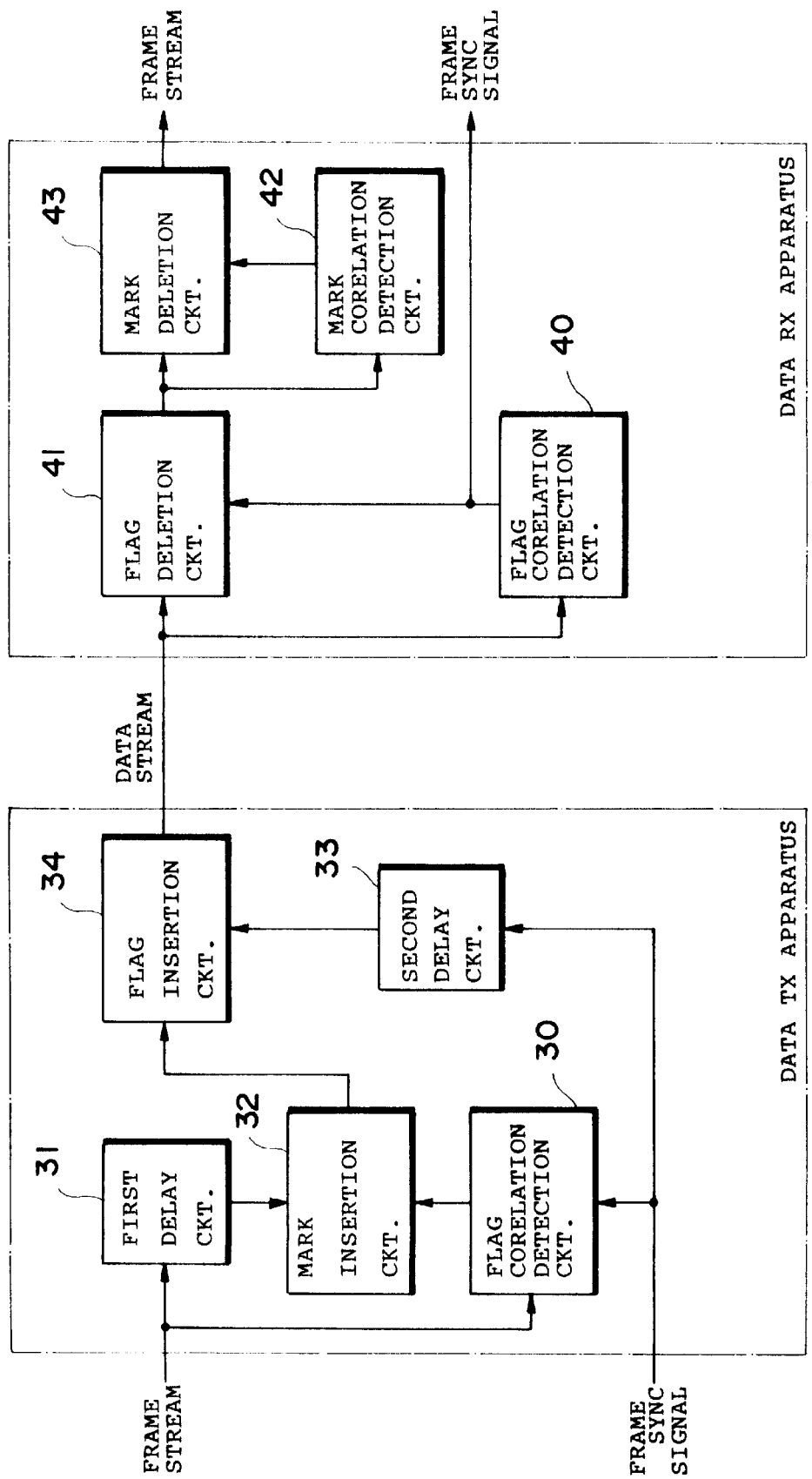
FIG. 3 is a block diagram showing the configuration of the data transmission and receipt apparatus according to the second embodiment.

As shown in FIG. 3, the data transmission apparatus incorporates the flag correlation detection circuit 30, the first delay circuit 31, the mark insertion circuit 32, the second delay circuit 33, and the flag insertion circuit 34. The flag correlation detection circuit 30 operates like the flag correlation detection circuit 10 in the first embodiment, the mark insertion circuit 32 operates like the mark insertion circuit 11 therein, and the flag insertion circuit 34 operates like the flag insertion circuit 12 therein. The first delay circuit 31 delays the incoming frame stream while the second delay circuit 33 delays the incoming frame synchronization signal.

The data receipt apparatus incorporates the flag correlation detection circuit 40, the flag deletion circuit 41, the mark correlation detection circuit 42, and the mark deletion circuit 43. The flag correlation detection circuit 40 operates like the flag correlation detection circuit 20 in the first embodiment, the flag deletion circuit 41 operates like the flag deletion circuit 24 therein, the mark correlation detection circuit 42 operates like the mark correlation detection circuit 21 therein, and the mark deletion circuit 43 operates like the mark deletion circuit 25 therein.

Figure 4:
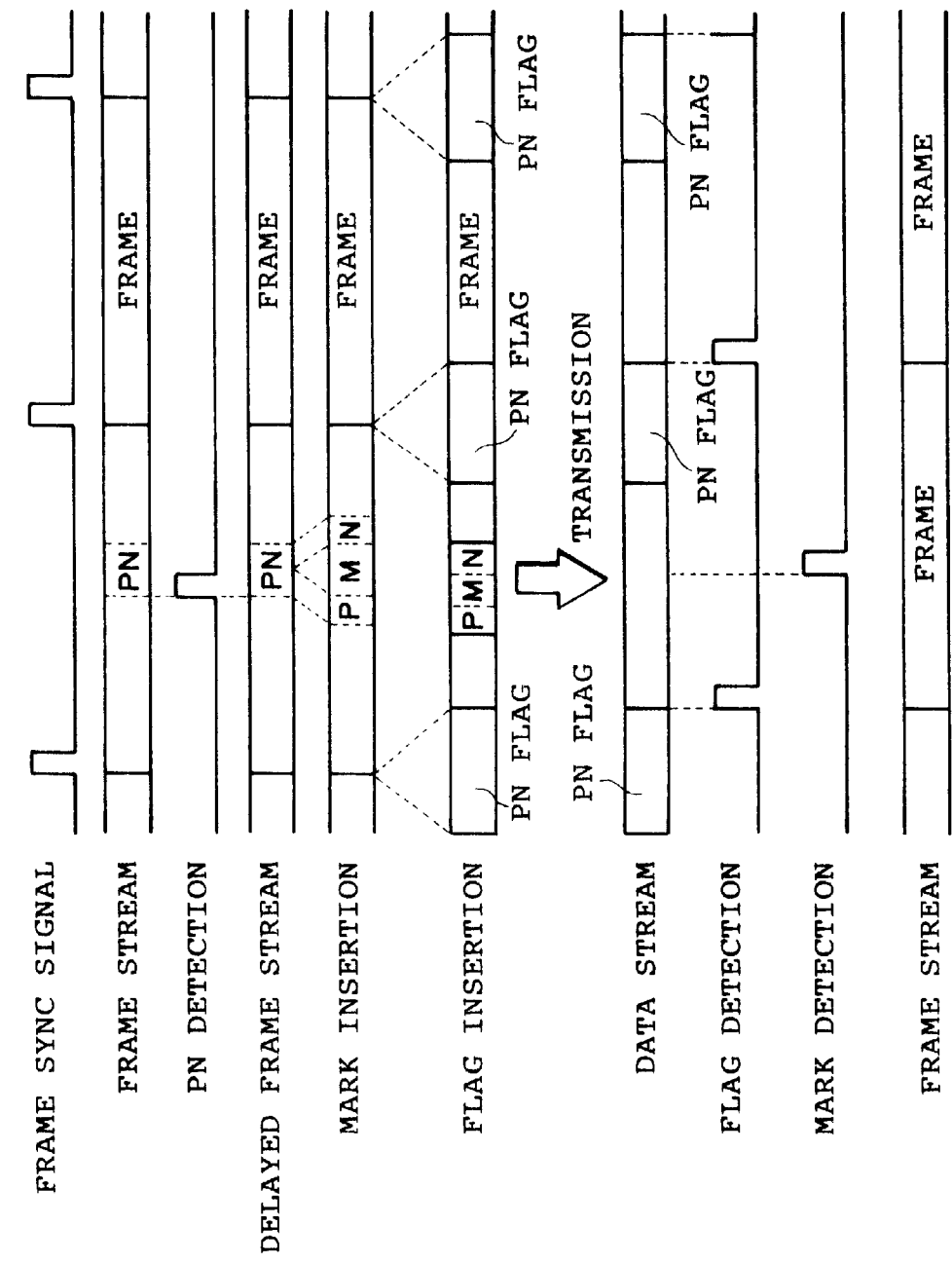
FIG. 4 is a time chart showing the operation of the data transmission and receipt apparatus of the second embodiment.

The operation of the data transmission and receipt apparatus will be described below referring to FIG. 4. First, the frame stream and the frame synchronization signal are fed to the data transmission apparatus. Using the TX ref flag, the flag correlation detection circuit 30 detects the bit streams having the pattern of the PN flags, thus outputting to the mark insertion circuit 32 the detection signal indicative of presence of such bit streams. The first delay circuit 31 delays the incoming data stream by a given time. Upon receipt of the detection signal from the flag correlation detection circuit 30, the mark insertion circuit 32 inserts marks into the above bit streams themselves, respectively. In other words, each bit stream is divided into to two portions by a mark. In FIG. 4, the reference symbol "P" denotes a portion of a bit stream similar to the PN flags and the reference symbol "N" denotes another portion thereof.

Similarly to the first delay circuit 31, the second delay circuit 33 delays the frame synchronization signal by the same time as that of the first delay circuit 31. In synchronization with the frame synchronization signal delayed by the second delay circuit 33, the flag insertion circuit 34 inserts regular PN flags between the frames of the frame stream delayed by the first delay circuit 31. This provides such a data stream that there are laid marks in the bit streams having the pattern of the PN flags, which reaches the data receipt apparatus via a propagation path.

Using the RX ref flag, the flag correlation detection circuit 40 detects the PN flags in the received data stream based upon the correlation values thereof. Upon detection of the PN flags, the flag correlation detection circuit 40 outputs to the flag deletion circuit 41 the flag detection signal indicative of presence of PN flags, which is also output outward as the frame synchronization signal. The flag deletion circuit 41 deletes the PN flags specified by the flag detection signal from the data stream, which is fed to mark correlation detection circuit 42 and the mark deletion circuit 43.

The mark correlation detection circuit 42 detects the marks in the data stream using the RX ref flag/mark having the combined pattern of the portion "P", the mark "M", and the portion "N". Based upon the correlation values between arbitrary bit streams in the data stream and the RX ref flag/mark, the mark correlation detection circuit 42 recognizes the bit streams having the largest correlation values to be identical with the RX ref flag/mark. Upon detection of such bit streams, the mark correlation detection circuit 42 outputs to the mark deletion circuit 43 the mark detection signal indicative of presence thereof. The mark deletion circuit 43 deletes from the data stream the marks designated by the mark detection signal. Hence, the data stream without the PN flags and the marks is provided from the mark deletion circuit 43.

As described above, according to the second embodiment, the data transmission apparatus inserts into a bit stream having the same pattern of the PN flags, a mark indicative of presence of such a bit stream, and also the data receipt apparatus detects in the data stream the combination of such a bit stream and mark, using the RX ref flag/mark that has the pattern of the combination. Compared with the RX ref flag including only the PN flag shown in the first embodiment, the RX ref flag/mark in the second embodiment is longer. Therefore, the probability that a bit stream in the data stream has the pattern of the RX ref flag/mark in the second embodiment becomes smaller than the probability that a bit stream in the data stream has the pattern of RX ref flag in the first embodiment. Consequently, this can more decrease occurrence of a flag emulation. In addition, application of PN sequence to the PN flags and the marks facilitates detection thereof in the data stream.

<Third Embodiment>

The data transmission and receipt apparatus of the third embodiment will be now described hereinafter. As discussed above, both the first and second embodiments feature decreasing the probability of occurrence of a flag emulation. Besides, the data transmission and receipt apparatus of the third embodiment features that there occurs no flag emulation. To achieve the purpose, in addition to employing the above mark, the third embodiment employs a flag mark, in which the flag mark is indicative of presence of the regular PN flag and the pattern thereof is completely different from the pattern of the mark.

Figure 5:
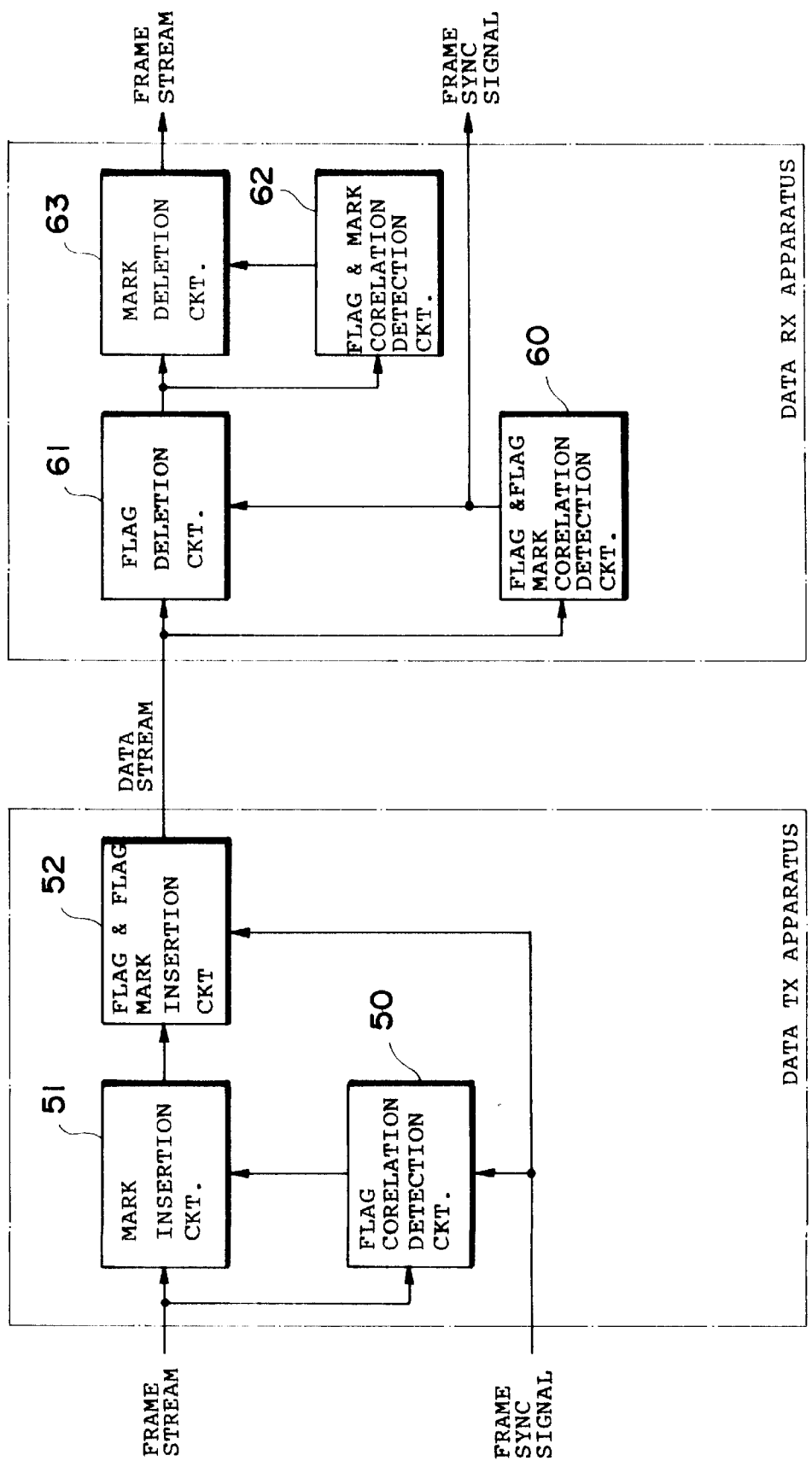
FIG. 5 is a block diagram showing the configuration of the data transmission and receipt apparatus according to the third embodiment.

As shown in FIG. 5, the data transmission apparatus incorporates the flag correlation detection circuit 50, the mark insertion circuit 51, and the flag & flag mark insertion circuit 52. The flag correlation detection circuit 50 operates similar to the flag correlation detection circuit 10 in the first embodiment, the mark insertion circuit 51 operates similar to the mark insertion circuit 11 therein, and the flag & flag mark insertion circuit 52 operates similar to the flag insertion circuit 12 therein.

The data receipt apparatus incorporates the flag & flag mark correlation detection circuit 60, flag deletion circuit 61, the flag & mark correlation detection circuit 62, and the mark deletion circuit 63. The flag & flag mark correlation detection circuit 60 operates similar to the flag correlation detection circuit 20 in the first embodiment, and the flag & mark correlation detection circuit 62 operates similar to the mark correlation detection circuit 21 therein. The flag deletion circuit 61 operates similar to the flag deletion circuit 24 therein. The mark deletion circuit 63 operates similar to the mark deletion circuit 25 therein.

Herein, the PN flags are identical with the PN flags shown in the first and second embodiment. The marks are also identical with the marks shown therein. The flag marks are employed to denote presence of the PN flags, which are composed pursuant to PN sequence, wherein the pattern of the flag marks are completely different from the pattern of the marks.

Figure 6:
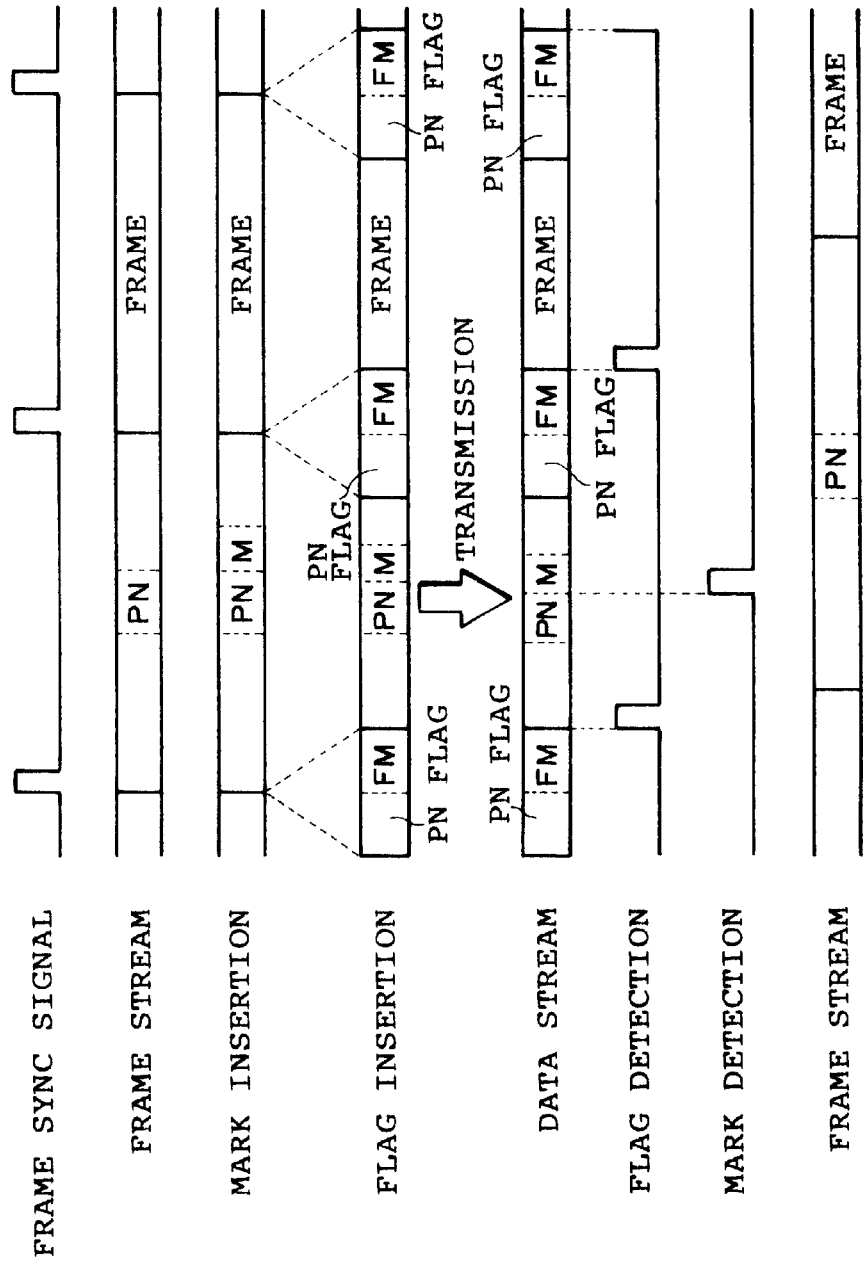
FIG. 6 is a time chart showing the operation of the data transmission and receipt apparatus of the third embodiment.

The operation of the data transmission and receipt apparatus of the third embodiment will be described below referring to FIG. 6, wherein the reference symbol "FM" denotes the flag marks. First, into the data transmission apparatus are fed the frame stream and the frame synchronization signal. The flag correlation detection circuit 50 detects bit streams the patterns of which are identical with the pattern of PN flag, in the incoming frame stream. Upon detection of such bit streams, the flag correlation detection circuit 50 outputs to the mark insertion circuit 51 and the f-like bit stream detection signal indicative of presence of the bit streams.

In response to the f-like bit stream detection signal from the flag correlation detection circuit 50, the mark insertion circuit 51 inserts marks into the frame stream. More definitely, the mark insertion circuit 51 inserts the marks immediately after the bit streams, respectively. The flag & flag mark insertion circuit 52 inserts PN flags and flag marks corresponding to the PN flags in synchronization with the incoming synchronization signal denoting the boundaries between the frames in the frame stream. The data transmission apparatus sends to the data receipt apparatus the data stream involving the PN flags, the corresponding flag marks, and the marks.

In the data receipt apparatus, upon receipt of the data stream, the flag & flag mark correlation detection circuit 60 detects the PN flags based upon the correlation values between arbitrary bit streams in the data stream and the first RX ref flag. Herein, the first RX ref flag in the third embodiment has the pattern of combination of the PN flag and the flag mark. Therefore, by comparing the first RX ref flag and the data stream to produce the correlation values, the flag & flag mark correlation detection circuit 60 recognizes the bit stream having the largest correlation values as the combination of a PN flag and a corresponding flag mark. When detecting the flags and the corresponding flag marks, the flag & flag mark correlation detection circuit 60 outputs to the flag deletion circuit 61 the flag & flag mark detection signal indicative of presence thereof, which is output outward as the frame synchronization signal. upon receipt of the flag & flag mark detection signal, the flag deletion circuit 61 deletes the PN flags and the corresponding flag marks from the received data stream, which is fed to the flag & mark correlation detection circuit 62 and the mark deletion circuit 63. The flag & mark correlation detection circuit 62 detects the bit steams having the pattern of the PN flag, and more specifically, detest the bit streams having the combined pattern of a PN flag and a corresponding mark based upon the correlation values between arbitrary bit streams in the received data stream and the second RX ref flag. Herein, the second RX ref flag has the pattern of combination of a PN flag and a corresponding mark, which is composed pursuant to PN sequence. Accordingly, the flag & mark correlation detection circuit 62 recognizes the bit stream having the largest correlation values to be a combination of a PN flag and a mark. Upon detecting the bit streams, the flag & mark correlation detection circuit 62 outputs to the mark deletion circuit 63 the f-like bit stream detection signal denoting presence of such a bit stream. Responding to the f-like bit stream detection signal, the mark deletion circuit 63 deletes the marks specified thereby from the received data stream. This provides the frame stream having neither the PN flags, the corresponding flag marks, nor the marks.

As described above, according to the third embodiment, the flag marks denoting the presence of the PN flags are respectively laid after the PN flags, while the marks which denote the presence of the bit streams similar to the PN flags and which completely differ from the flag marks are respectively laid after those bit streams. Consequently, the pattern of combination of the PN flag and the corresponding mark is perfectly different from the pattern of combination of the bit stream similar to the PN flag and the corresponding mark. In other words, any pattern of an arbitrary bit stream and the mark does not agree with the pattern of the PN flag and the flag mark. Thus, the third embodiment can completely avoid occurrence of a flag emulation, that is to say, no patterns of bit streams causes a flag emulation. In addition, applying PN sequence to the flag marks and marks facilitates detection of both the presence of combination of the PN flag and the corresponding flag mark and presence of combination of the bit stream similar to the PN flag and the corresponding mark.

<Fourth Embodiment>

Hereinafter, the data transmission and receipt apparatus of the fourth embodiment will be now described. As discussed above, the data transmission and receipt apparatus of the third embodiment sets one flag mark for each PN flag. To the contrary, the data transmission and receipt apparatus of the fourth embodiment sets the flag mark according to necessity. More specifically, only if there is laid a bit stream similar to the flag mark or the mark after the regular PN flag in the incoming frame stream, the data transmission and receipt apparatus of the fourth embodiment sets the flag mark. The PN flags, the flag marks corresponding thereto, and the marks in the fourth embodiment are the same as those in the third embodiment.

Figure 7:
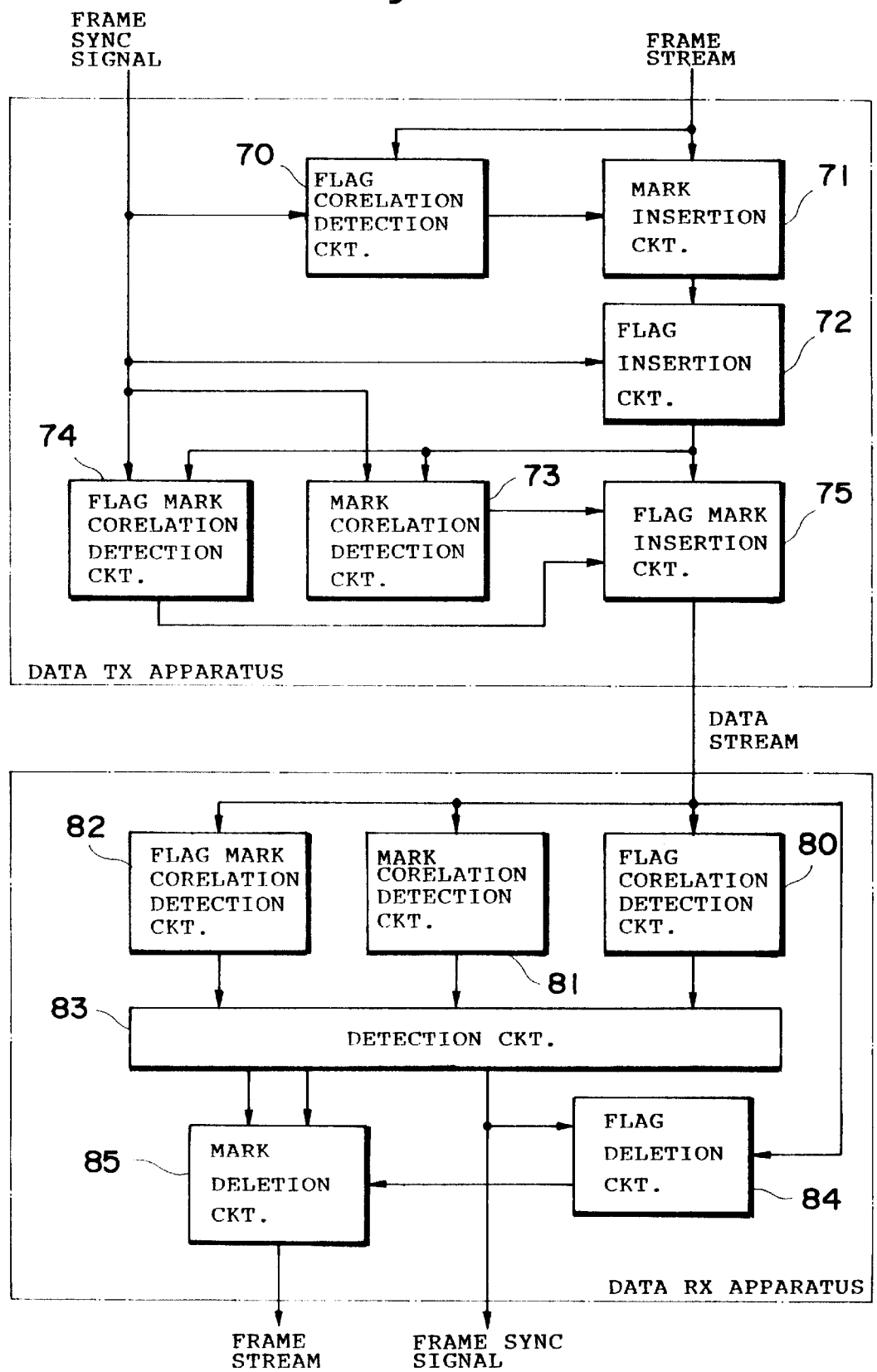
FIG. 7 is a block diagram showing the configuration of the data transmission and receipt apparatus according to the fourth embodiment.

The configuration of the data transmission and receipt apparatus of the fourth embodiment will be described hereinafter. As shown in FIG. 7, the data transmission apparatus incorporates the flag correlation detection circuit 70, the mark insertion circuit 71, the flag insertion circuit 72, the mark correlation detection circuit 73, the flag mark correlation detection circuit 74, and the flag mark insertion circuit 75. The flag correlation detection circuit 70, the mark correlation detection circuit 73, and the flag mark correlation detection circuit 74 operates similar to the flag correlation detection circuit 50 in the third embodiment. The mark insertion circuit 71, the flag insertion circuit 72, and the flag mark insertion circuit 75 operate similar to the mark insertion circuit 51 and the flag & flag mark insertion circuit 52 therein.

The data receipt apparatus incorporates the flag correlation detection circuit 80, the mark correlation detection circuit 81, the flag mark correlation detection circuit 82, the detection circuit 83, the flag deletion circuit 84, and the mark deletion circuit 85. The flag correlation detection circuit 80, the mark correlation detection circuit 81, and the flag mark correlation detection circuit 82 operates similar to the flag & flag mark correlation detection circuit 60 and the flag & mark correlation detection circuit 62 in the third embodiment. The detection circuit 83 detects the flags, the flag marks, and the marks in the data stream based upon the results of the flag correlation detection circuit 80, the mark correlation detection circuit 81, and the flag mark correlation detection circuit 82. The flag deletion circuit 84 and the mark deletion circuit 85 operate similar to the flag deletion circuit 61 and the mark deletion circuit 63 therein.

Figure 8:
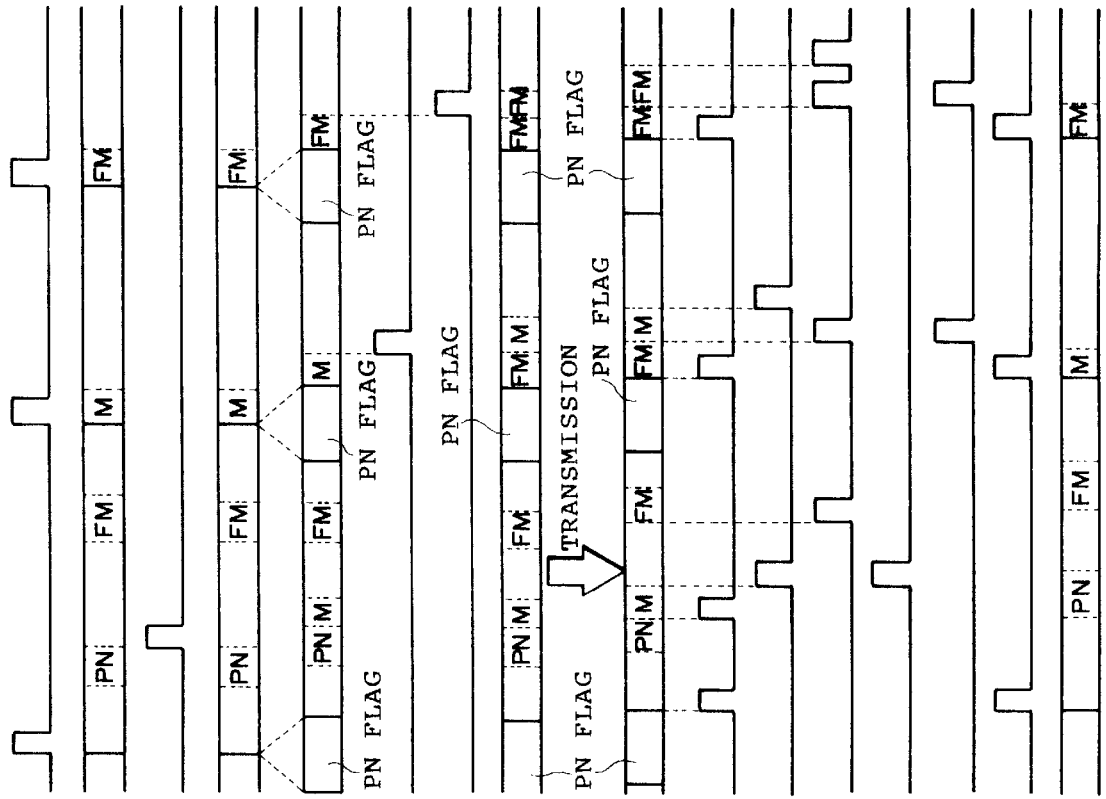
FIG. 8 is a time chart showing the operation of the data transmission and receipt apparatus of the fourth embodiment.

The operation of the data transmission and receipt apparatus of the fourth embodiment will be described hereinafter. As shown in FIG. 8, first the data stream and the frame synchronization signal are fed to the data transmission apparatus. Responding thereto, the flag correlation detection circuit 70 detects the bit steams similar to the PN flags based upon the correlation values between the frame stream and the RX ref flag. Herein, the RX ref flag has the same pattern as those of the PN flags. When detecting such bit stream, the flag correlation detection circuit 70 outputs the mark insertion circuit 71 the f-like bit stream detection signal indicative of presence thereof. Upon receipt of the f-like bit stream detection signal, the mark insertion circuit 71 inserts marks immediately after those bit streams, respectively, whereby the frame stream having the marks is fed to the flag insertion circuit 72. Into the frame stream, the flag insertion circuit 72 inserts PN flags in synchronization with the incoming frame synchronization signal, thus providing the data stream having the PN flags for the following circuits 73, 74 and 75.

On the basis of the frame synchronization signal, the mark correlation detection circuit 73 detects the bit steams laid immediately after the PN flags. Thereafter, the mark correlation detection circuit 73 judges whether or not each of the patterns of the bit streams is similar to the pattern of the marks. If similar, the mark correlation detection circuit 73 outputs to the flag mark insertion circuit 75 the m-like bit stream detection signal indicative of presence of those bit streams, and otherwise not. The flag mark correlation detection circuit 74 likewise detects the bit stream laid immediately after the PN flags. The flag mark correlation detection circuit 74 further judges whether or not each of the patterns of the bit streams is similar to the pattern of flag marks. If similar, the flag mark correlation detection circuit 74 outputs to the flag mark insertion circuit 75 fin-like bit stream detection signal indicative of presence of those bit streams.

In general, a bit stream in a PN flag has a possibility of being a pattern different from both the pattern of the mark and the pattern of the flag mark, a possibility of being a pattern similar to the pattern of the mark, and a possibility of being a pattern similar to the pattern of the flag mark. The flag mark insertion circuit 75 therefore inserts in the frame stream no flag mark when receiving neither the m-like bit stream detection signal from the mark correlation detection circuit 73 nor the fm-like bit stream detection signal from the flag mark correlation detection circuit 74. The flag mark insertion circuit 75, however, inserts a flag mark prior to the bit stream specified by the m-like bit stream detection signal. More specifically the flag mark insertion circuit 75 inserts a flag mark between the bit stream and the PN flag laid prior to the bit stream. Consequently, the vicinity of the bit stream similar to the PN flag is arranged in order of the PN flag, the flag mark, and the bit stream in the direction from the start of the frame to the end thereof.

Similarly, upon receipt of the fin-like bit stream detection signal from the flag mark correlation detection circuit 74, the flag mark insertion circuit 75 inserts a flag mark prior to the bit stream designated thereby. As a result, the PN flag, the flag mark, and the bit stream are arranged in this order. Thereby, the data stream that has experienced insertion of flag mark is transmitted to the data receipt apparatus.

In the data receipt apparatus, the flag correlation detection circuit 80 detects the bit streams similar to the PN flags in the data stream based upon the correlation values therebetween. Upon detection of the bit streams, the flag correlation detection circuit 80 outputs the detection circuit 83 the f-like bit stream detection signal of presence thereof. Similarly, the mark correlation detection circuit 81 and the flag mark correlation detection circuit 82 respectively detect the bit streams similar to the marks and the bit streams similar to the flag marks using respective correlation values thereof, and also outputs to the detection circuit 83 the m-like bit stream detection signal indicative of presence of the bit stream similar to the marks and the fm-like bit stream detection signal indicative of presence of the bit streams similar to the flag marks.

Using the above signals from the flag correlation detection circuit 80, the mark correlation detection circuit 81, and the flag mark correlation detection circuit 82, the detection circuit 83 analyze the pattern of the bit streams. More specifically, if those bit stream detection signals represent that a bit stream is composed of a PN flag, a flag mark, and a bit stream similar to the mark, and more definitely suggest that the PN flag, the flag mark, and the bit stream are continuously arranged in this order, the detection circuit 83 recognizes the PN flag in the bit stream as to be a regular PN flag, thus instructing the flag deletion circuit 84 to delete the PN flag and the flag mark from the data stream. Similarly, if those signals represents that a bit stream is composed of a PN flag, a flag mark, and a bit stream similar to the flag mark, the detection circuit 83 recognizes the PN flag in the bit stream as a regular PN flag, thereby instructing the flag deletion circuit 84 to delete the PN flag and the flag mark from the data stream.

If the signals represents that a bit stream is composed of a bit stream similar to the PN flags and a mark, the detection circuit 83 recognizes that there is no PN flags but recognizes that there is a bit stream similar to PN flags, thus instructing the mark deletion circuit 85 to delete the mark from the data stream. this provides the data stream, in which the PN flags, and the corresponding flag marks, and the marks are deleted but the bit streams similar to the PN flags are still kept.

As described above, the data transmission and receipt apparatus according to the fourth embodiment inserts the flag mark immediately after the PN flag in the frame stream only when the bit stream following the PN flag is similar to either the mark or the flag mark. Therefore, in comparison with the third embodiment that inserts a flag mark for each PN flag, the fourth embodiment decreases the number of times of using flag marks, which improves the transmission efficiency. In addition, applying PN sequence to the PN flags, the flag marks, and the marks fascinates detection thereof.

<Fifth Embodiment>

The data transmission and receipt apparatus according to the fifth embodiment will be now described hereinafter. The data transmission and receipt apparatus features employing the pattern of the PN flags as those of the flag marks in order to remove the flag mark correlation detection circuit 74 in the fourth embodiment.

Figure 9:
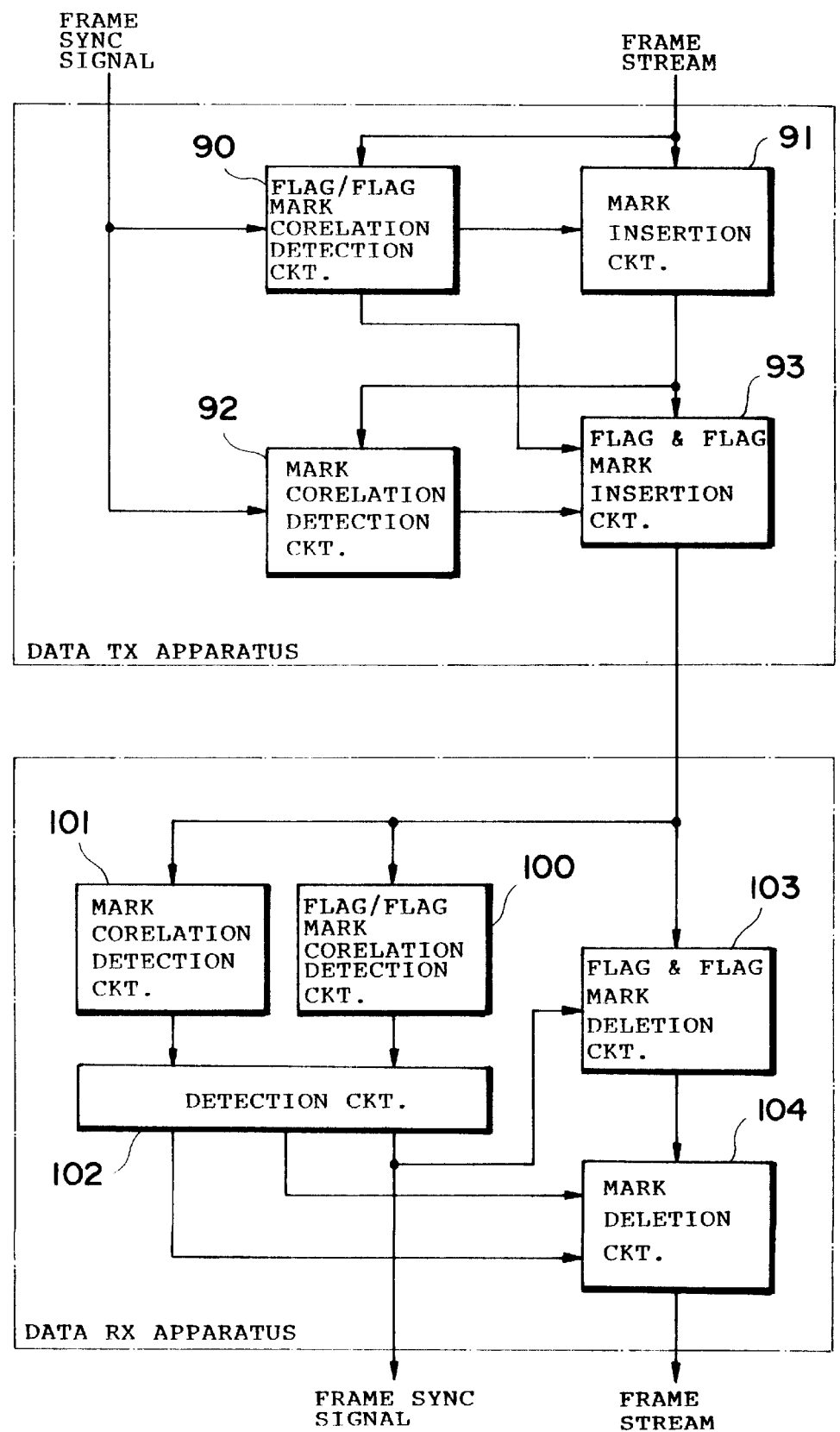
FIG. 9 is a block diagrams showing the configuration of the data transmission and receipt apparatus according to the fifth embodiment.

The configuration of the data transmission and receipt apparatus of the fifth embodiment will be explained below. In FIG. 9, the data transmission apparatus according to the fifth embodiment comprises the flag/flag mark correlation detection circuit 90, the mark insertion circuit 91, the mark correlation detection circuit 92, and the flag & flag mark insertion circuit 93. The flag/flag mark correlation detection circuit 90 operates like the flag correlation detection circuit 70 and the flag mark correlation detection circuit 74 in the fourth embodiment. The mark insertion circuit 91 operates likes the mark insertion circuit 71. The mark correlation detection circuit 92 operates like the mark correlation detection circuit 73 therein. The flag & flag mark insertion circuit 93 operates like the flag insertion circuit 72 and the flag mark insertion circuit 75 therein.

The data receipt apparatus according to the fifth embodiment comprises the flag/flag mark correlation detection circuit 100, the mark correlation detection circuit 101, the detection circuit 102, the flag & flag mark deletion circuit 103, and the mark deletion circuit 104. The flag/flag mark correlation detection circuit 100 operates like the flag correlation detection circuit 80 and the flag mark correlation detection circuit 82 in the fourth embodiment. The mark correlation detection circuit 101 operates like the mark correlation detection circuit 81 therein. The flag & flag mark deletion circuit 103 operates like the flag deletion circuit 84. The mark deletion circuit 104 operates like the mark deletion circuit 85 therein.

Figure 10:
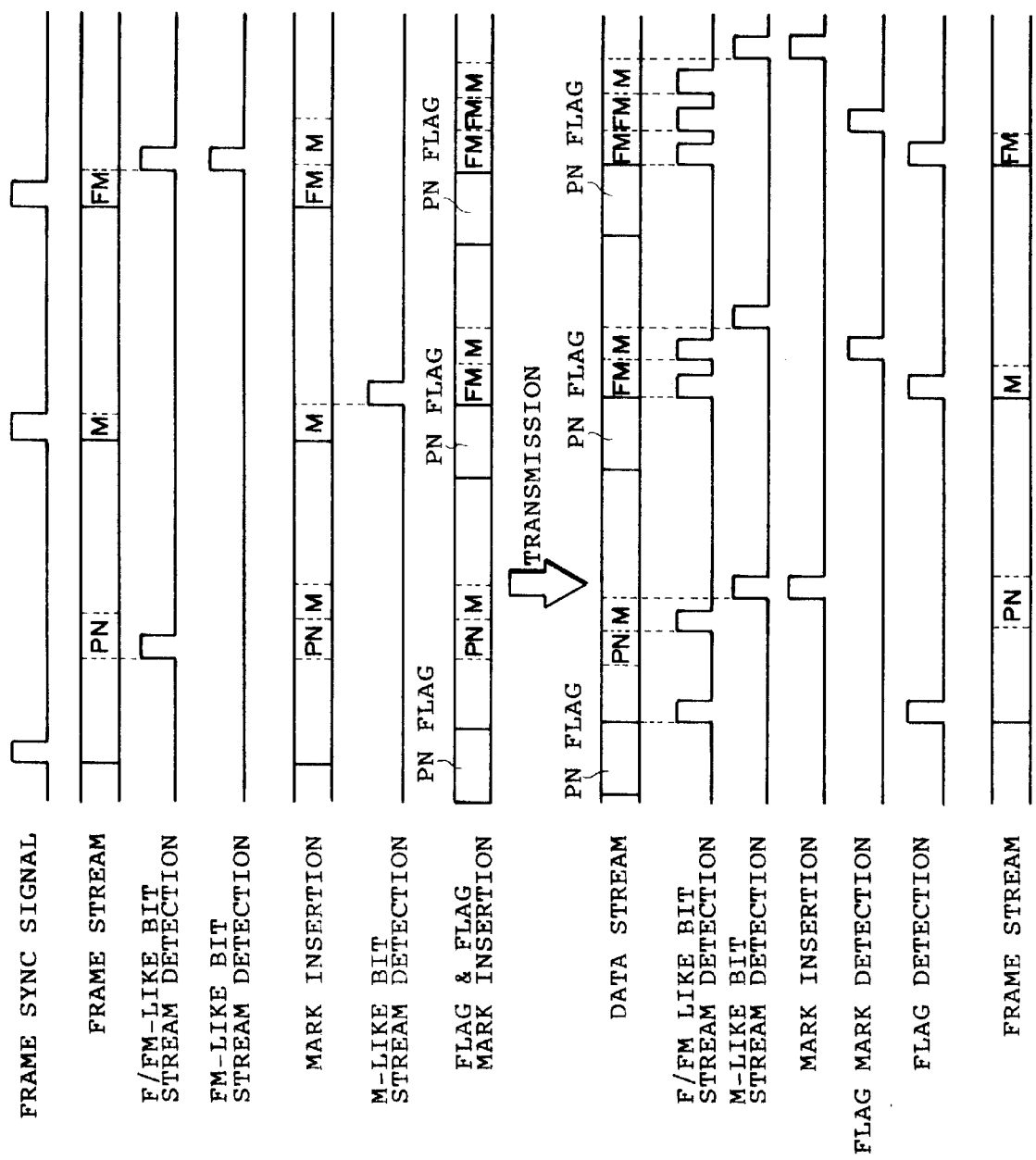
FIG. 10 is a time chart showing the operation of the data transmission and receipt apparatus of the fifth embodiment.
Figure 11:
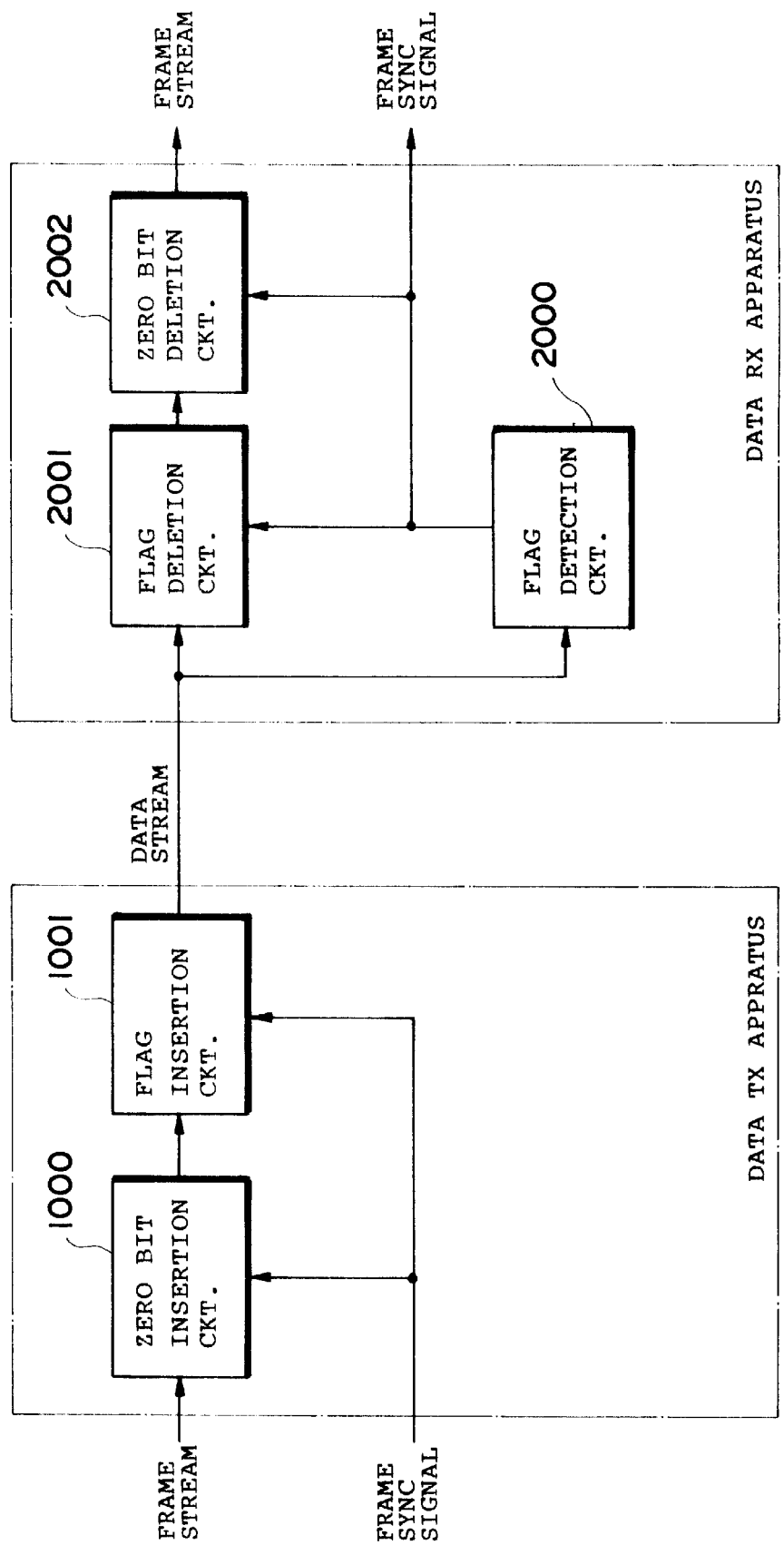
FIG. 11 is a block diagram showing the configuration of a conventional data transmission and receipt apparatus using HDLC system.
Figure 12:
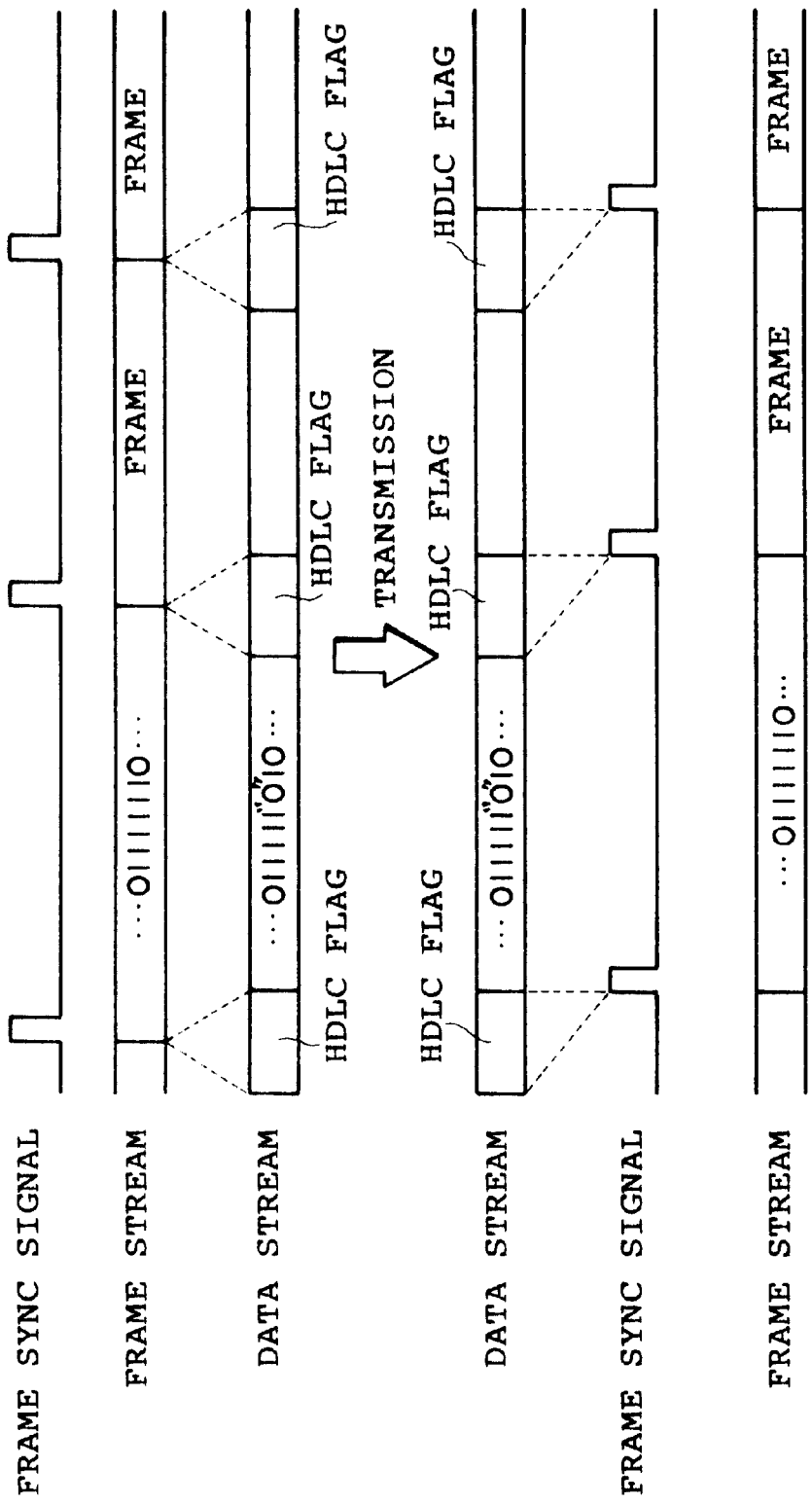
FIG. 12 is a time chart showing the operation of the data transmission and receipt apparatus of the conventional data transmission and receipt apparatus using HDLC system.
Figure 13:
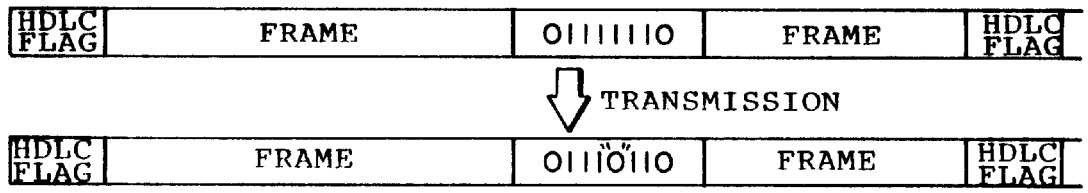
FIG. 13 is a diagram showing a failure in detecting a HDLC flag due to a bit error in the HDLC flag in the data transmission and receipt apparatus of FIG. 11.
Figure 14:
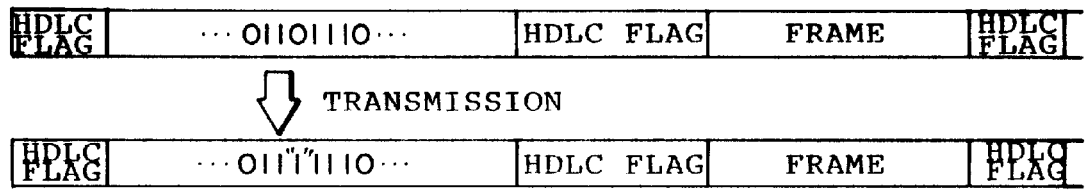
FIG. 14 is a diagram showing a flag emulation due to a bit error in a frame in the data transmission and receipt apparatus of FIG. 11.
Figure 15:
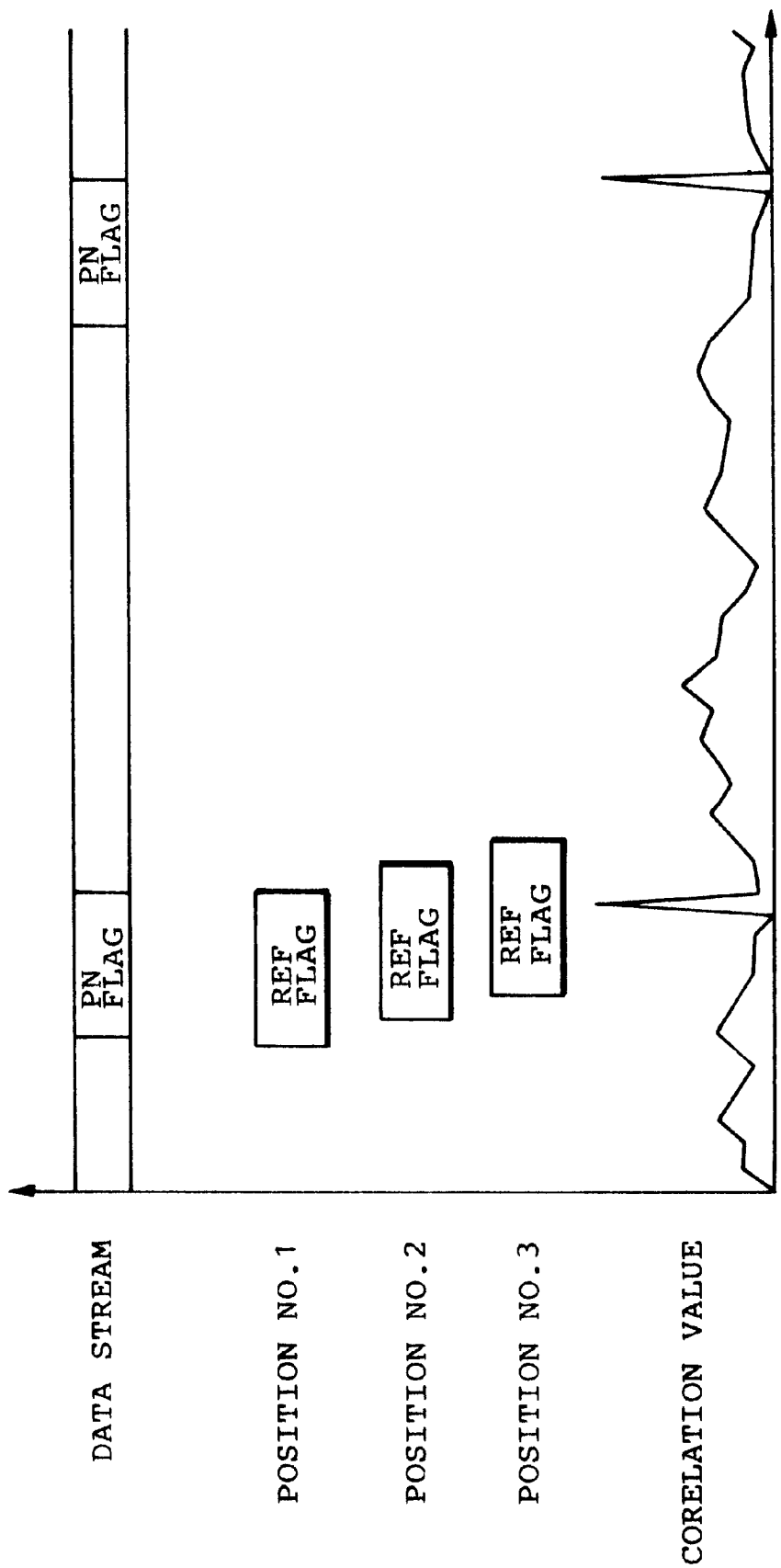
FIG. 15 is a diagram showing the calculation of correlation values between a data stream and a reference flag.
Figure 16:
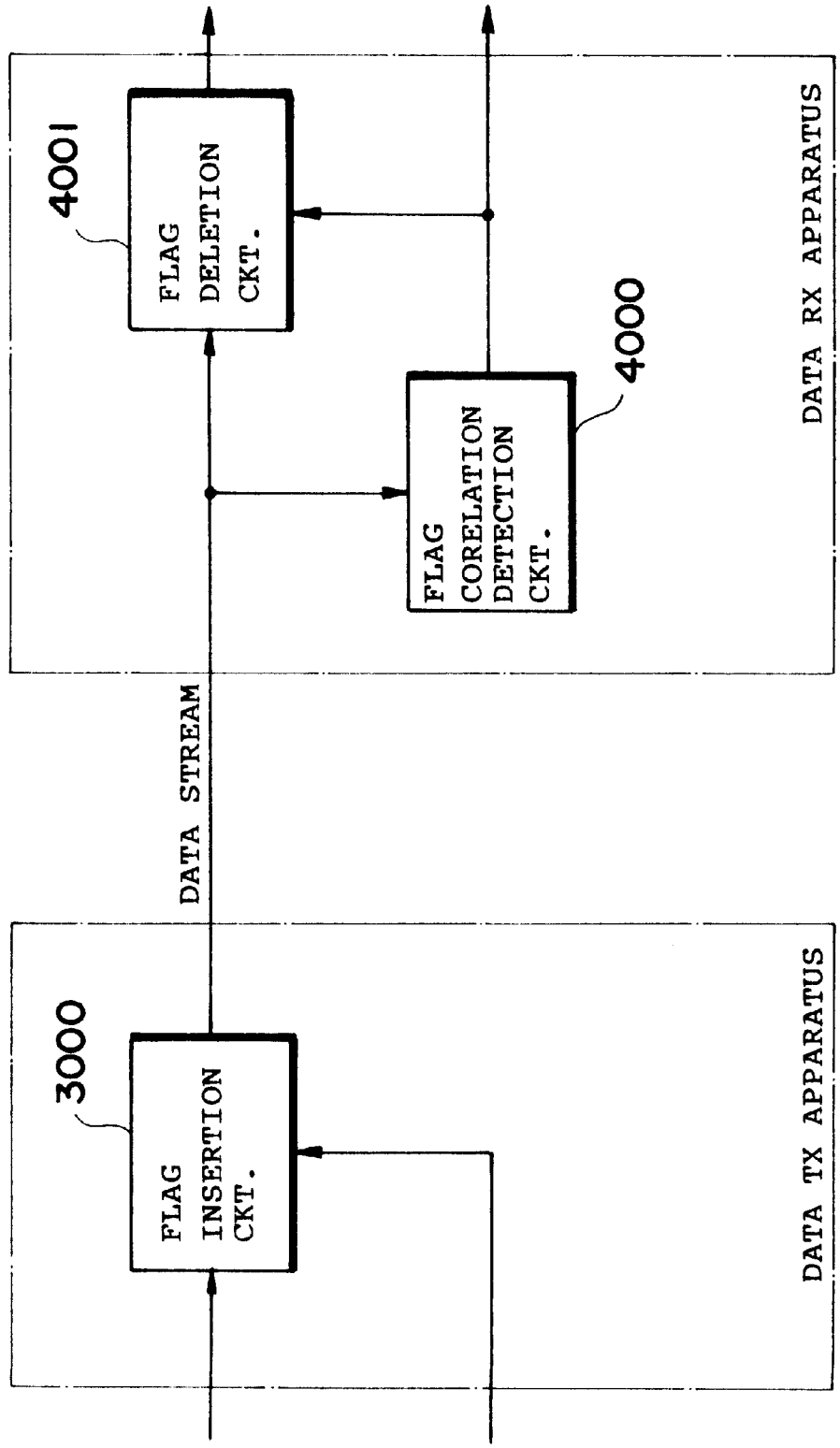
FIG. 16 is block diagram showing the configuration of the conventional data transmission and receipt apparatus using PN sequence.
Figure 17:
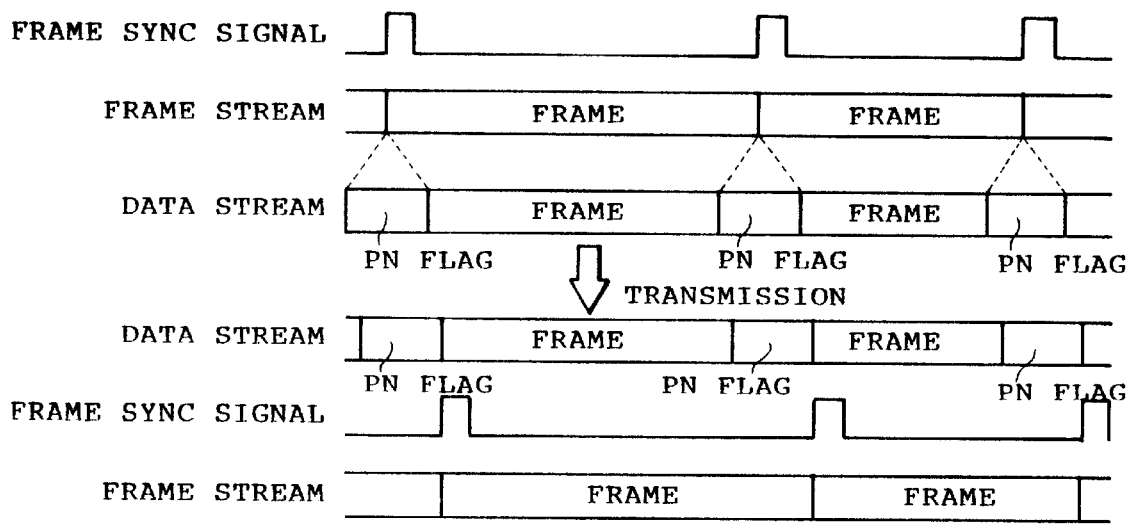
FIG. 17 is a time chart showing the operation of the conventional data transmission and receipt apparatus using PN sequence.
Figure 18:
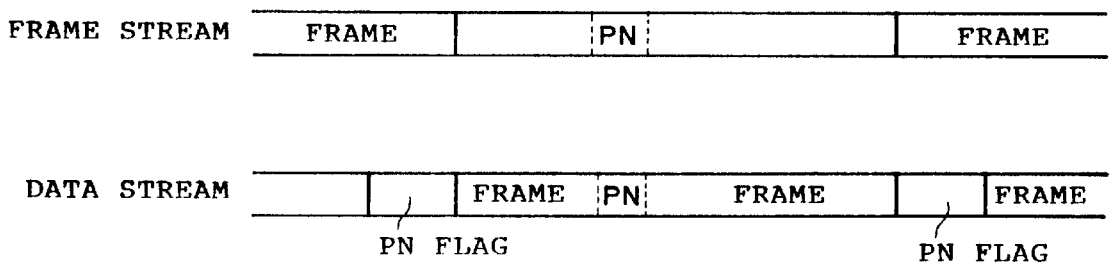
FIG. 18 is a diagram showing a flag emulation due to a bit stream similar to a PN flag in the data transmission and receipt apparatus of FIG. 16.

The operation of the data transmission and receipt apparatus according to the fifth embodiment will be explained below. In FIG. 10, the frame stream and the frame synchronization signal are fed to the data transmission apparatus. In the transmission apparatus, the flag/flag mark correlation detection circuit 90 detects the bit streams similar to the PN flags or the flag marks based upon the correlation values thereof. When detecting those bit streams, the flag/flag mark correlation detection circuit 90 outputs to the mark insertion circuit 91 the f-like bit stream detection signal indicative of presence of thereof. With reference to the frame synchronization signal, the flag/flag mark correlation detection circuit 90 detects the bit streams that will following the PN flags inserted by the flag & flag mark insertion circuit 93, thereby judging whether those bit streams are similar to the flag marks or not. If similar, the flag/flag mark correlation detection circuit 90 outputs to the flag & flag mark insertion circuit 93 the fm-like bit stream detection signal indicative of presence thereof.

The mark insertion circuit 91 inserts marks immediately after the bit streams similar to the PN flags according to the f-like bit stream detection signal, respectively. Hence, the data stream involving the marks is fed to the mark correlation detection circuit 92 and the flag & flag mark insertion circuit 93.

The mark correlation detection circuit 92 detects the bit streams that will follow the PN flags inserted by the flag & flag mark insertion circuit 93 with reference to the frame synchronization signal, thus judging whether or not those bit streams are similar to the marks based upon the correlation values thereof. If similar, the mark correlation detection circuit 92 outputs to the flag & flag mark insertion circuit 93 the m-like bit stream detection signal indicative of presence thereof, and otherwise not.

The flag & flag mark insertion circuit 93 inserts between the frames the PN flags with reference to the frame synchronization signal. If the frame synchronization signal and the fin-like bit stream signal represents that a PN flag and a following bit stream to similar to the flag mark are laid adjacent to each other, the flag & flag mark insertion circuit 93 inserts a flag mark therebetween. Similarly, the frame synchronization signal and the m-like bit stream signal represents that a PN flag and a following bit stream similar to the marks are laid adjacent to each other, the flag & flag mark insertion circuit 93 inserts a flag mark therebetween. Therefore, the data stream having the PN flags, the flag marks, and the marks is transmitted to the data receipt apparatus.

In the data receipt apparatus, the flag/flag mark correlation detection circuit 100 detects in the received data streams the bit streams similar to the PN flags or the flag marks based upon the correlation values thereof. Upon detection of those bit streams, the flag/flag mark correlation detection circuit 100 outputs to the detection circuit 102 the f/fm-like bit stream detection signal of presence thereof. The mark correlation detection circuit 101 detects in the data streams the bit streams similar to the marks on the basis of the correlation values thereof. When detecting those bit streams, the mark correlation detection circuit 101 outputs to the detection circuit 102 the m-like bit stream detection signal indicative of presence thereof.

Based upon the f/fm-like bit stream detection signal from the flag/flag mark correlation detection circuit 100 and the m-like bit stream detection signal from the mark correlation detection circuit 101, the detection circuit 102 instructs the flag & flag mark deletion circuit 103 and the mark deletion circuit 104 to delete the PN flags, flag marks, and the marks.

More specifically, if the signals denote that there are continuously laid a bit stream similar to the PN flags, another bit stream similar to the PN flags or the flag marks, and a bit stream similar to the marks, the detection circuit 102 recognizes them to be a regular PN flag, a flag mark, and a bit stream respectively, thus instructing the mark deletion circuit 104 to delete the PN flag and the flag mark.

If the signals denote that there are continuously laid bit streams each similar to the PN flags or the flag marks, the detection circuit 102 recognizes those bit streams to be a regular PN flag, a flag mark, and a bit stream similar to the flag marks, thereby instructing the flag & flag mark deletion circuit 103 to delete the PN flag and the flag mark from the data stream.

If the signals denote that there are continuously laid a bit stream similar to the PN flags or the flag marks, and a bit stream similar to the marks, the detection circuit 102 recognizes the former bit stream as a bit stream similar to the PN flags or the flag marks and also recognizes the latter bit stream as a mark, thereby instructing the mark deletion circuit 104 to delete the mark from the data stream. This gives the data stream that has experienced deletion of PN flags and flag marks and deletion of marks in the flag & flag mark deletion circuit 103 and the mark deletion circuit 104.

As described above, the data transmission and receipt apparatus according to fifth embodiment employs the pattern of the PN flags as the pattern of the flag marks. Therefore, the data transmission and receipt apparatus can avoid a flag emulation similarly to the fourth embodiment. Besides, in contrast with the data transmission and receipt apparatus of the fourth embodiment that requires the flag mark correlation detection circuit 74 and the flag mark correlation detection circuit 82, the data transmission and receipt apparatus of the fifth embodiment does not necessitates such dedicated circuits that detect the flag marks in the data stream, which enables both the data transmission apparatus and the data receipt apparatus to be smaller in size.

While the present invention has been described in terms of the preferred embodiment, the invention is not to be limited thereto, but can be embodied in various ways without departing from the principle of the invention as defined in the appended claims.

What is claimed is:

1. A frame synchronization method including the data stream preparation step having the step of preparing a data stream having a plurality of frames and a plurality of PN flags composed pursuant to PN sequence, each of the plurality of PN flags being laid between a frame and adjacent frame and denoting the boundary therebetween, and the step of transmitting the data stream, and the data stream synchronization step having the step of receiving the data stream, the step of calculating a plurality of correlation values between a reference flag identical with the PN flag and a plurality of bit streams in the data stream, the step of detecting a plurality of bit streams in the data stream having the possibilities of being the PN flags based upon the calculated correlation values, and the step of synchronizing the data stream using the plurality of bit streams having the possibilities of being the plurality of PN flags, wherein the data stream preparation step comprises the step of detecting in the data stream a bit stream similar to the PN flag; and the step of inserting into the data stream a mark specifying the bit stream similar to the PN flag, the data stream synchronization step comprises the step of detecting the mark from the data stream; the step of recognizing a bit stream that is one of the plurality of bit streams having the possibilities of being the PN flags and is specified by the mark, not to be a PN flag, and wherein the step of synchronizing in the data stream synchronization step synchronizes the data stream using the detected plurality of bit steams having the possibilities of the plurality of PN flags except for the bit stream recognized not to be a PN flag.

2. A frame synchronization method as set forth in claim 1, wherein the mark is composed pursuant to PN sequence, wherein the step of detecting in the data stream synchronization step detects the mark based upon correlation values between a reference mark identical with the mark and a plurality of bit stream in the data stream.

3. A frame synchronization method as set forth in claim 1, wherein the data stream preparation step inserts adjacent to the bit stream similar to the PN flag the mark denoting that the neighboring bit stream is not a PN flag.

4. A frame synchronization method as set forth in claim 3, wherein the data stream preparation step inserts immediately after the bit stream similar to the PN flag the mark denoting that the bit stream prior thereto is not a PN flag.

5. A frame synchronization method as set forth in claim 1, wherein the data stream preparation step inserts the mark into the bit stream similar to the PN flag, wherein the step of detecting in the data stream synchronization step detects the combination of the mark and bit stream in the data stream based upon correlation values between a reference mark identical with the combination thereof and a plurality of bit streams in the data stream.

6. A frame synchronization method as set forth in claim 1, wherein the data stream preparation step inserts a flag mark differing from the mark used for distinguishing a PN flag from the bit stream similar to the PN flag.

7. A frame synchronization method as set forth in claim 6, wherein the data stream preparation step inserts the flag mark adjacent to the PN flag.

8. A frame synchronization method as set forth in claim 7, wherein the data stream preparation step inserts the flag mark immediately after the PN flag.

9. A frame synchronization method as set forth in claim 8, wherein when there is laid one of a bit stream similar to the mark and a bit stream similar to the flag mark immediately after the PN flag, the data stream preparation step inserts the flag mark therebetween.

10. A frame synchronization method as set forth in claim 9, wherein the data stream preparation step inserts the flag mark the pattern of which is identical with the pattern of the PN flag.

11. A system including a data transmission apparatus that prepares a data stream having a plurality of frames and a plurality of PN flags composed pursuant to PN sequence, each of the plurality of PN flags being laid between a frame and adjacent frame and denoting the boundary therebetween, and a data receipt apparatus that synchronizes the data stream using the plurality of PN flags, wherein the data transmission apparatus comprises a detection circuit detecting in the data stream a bit stream similar to the PN flag; and an insertion circuit inserting into a frame a mark specifying the bit stream similar to the PN flag;

the data receipt apparatus comprises a mark detection circuit detecting the mark from the data stream; a calculation circuit calculating correlation values between a reference flag identical with the PN flag and a plurality of bit streams in the data stream; a detection circuit detecting a plurality of bit stream having the possibilities of being the plurality of PN flags; a recognition circuit recognizing a bit stream specified by the mark among the plurality of bit streams having the possibilities of being the PN flags not to be a PN flag and recognizing the plurality of bit streams other than the bit stream specified by the mark to be the plurality of PN flags; and a synchronization circuit synchronizing the data stream using the plurality of bit streams recognized to be the plurality of PN flags.

12. A system as set forth in claim 11, wherein the mark is composed pursuant to PN sequence.

13. A system as set forth in claim 11, wherein the insertion circuit inserts the mark adjacent to the PN flag.

14. A system as set forth in claim 13, wherein the insertion circuit inserts the mark immediately after the PN flag.

15. A system as set forth in claim 11, wherein the insertion circuit inserts the mark into the PN flag.

16. A system as set forth in claim 11, wherein the insertion circuit inserts a flag mark differing the mark used for distinguishing the PN flag from a bit stream similar to the PN flag.

17. A system as set forth in claim 16, wherein the insertion circuit inserts the mark immediately after the bit stream similar to the PN flag and inserts the flag mark immediately after the PN flag.

18. A system as set forth in claim 17, wherein the insertion circuit inserts the flag mark immediately after the PN flag upon detection that there is laid one of a bit stream similar to the mark and a bit stream similar to the flag mark after the PN flag.

19. A system as set forth in claim 16, wherein the flag mark is composed pursuant to PN sequence.

20. A system as set forth in claim 19, wherein the pattern of the flag mark is identical with the pattern of the PN flag.

* * * * *